United States Patent
Johansen

(10) Patent No.: US 6,213,100 B1
(45) Date of Patent: Apr. 10, 2001

(54) MULTI-FUNCTION FUEL PUMP MODULE

(75) Inventor: Mark R. Johansen, Wallingford, CT (US)

(73) Assignee: Walbro Corporation, Cass City, MI (US)

( * ) Notice: Subject to any disclaimer, the term of this patent is extended or adjusted under 35 U.S.C. 154(b) by 0 days.

(21) Appl. No.: 09/300,929

(22) Filed: Apr. 28, 1999

(51) Int. Cl.⁷ .................................................. F02M 37/04
(52) U.S. Cl. ......................... 123/509; 123/516; 137/202
(58) Field of Search ................................... 123/516, 518, 123/519, 520, 521, 509; 137/202, 143, 565, 571

(56) References Cited

U.S. PATENT DOCUMENTS

| | | | |
|---|---|---|---|
| 4,697,991 | * 10/1987 | Tsukahara et al. | 417/219 |
| 5,038,741 | * 8/1991 | Tuckey | 123/509 |
| 5,146,901 | * 9/1992 | Jones | 123/516 |
| 5,219,277 | 6/1993 | Tuckey . | |
| 5,257,916 | 11/1993 | Tuckey . | |
| 5,520,155 | * 5/1996 | Hefler | 123/509 |
| 5,579,742 | * 12/1996 | Yamazaki et al. | 123/520 |
| 5,596,971 | * 1/1997 | Kidokoro | 123/516 |
| 5,718,208 | * 2/1998 | Brautigan et al. | 123/516 |
| 5,749,347 | * 5/1998 | Torii et al. | 123/516 |
| 5,762,049 | * 6/1998 | Jones et al. | 123/514 |
| 5,809,976 | * 9/1998 | Cook et al. | 123/516 |
| 5,960,817 | * 10/1999 | Johansen et al. | 137/202 |

* cited by examiner

*Primary Examiner*—Carl S. Miller
(74) *Attorney, Agent, or Firm*—Reising, Ethington, Barnes, Kisselle, Learman & McCulloch, P.C.

(57) ABSTRACT

A module constructed to be disposed within a fuel tank of the vehicle fuel system carries a vapor vent valve, a fuel pump and other components, such as a fuel lever sender and an overpressure relief valve and outlet. Each of these components may thus be inserted through a single opening into the fuel tank to reduce the number of openings in the fuel tank to thereby reduce the emissions of hazardous hydrocarbon fuel vapors from the fuel tank. Further, the module provides additional protection to the vapor vent valve to prevent sloshing fuel within the fuel tank from entering the vent valve and escaping from the fuel tank and being transferred to the fuel vapor storage canister. The module is constructed such that a portion containing the fuel pump is designed to break away from the rest of the module sealed to the fuel tank, the fuel pump will move away from the vapor vent valve during a vehicle accident instead of crashing into the valve and damaging or destroying it as in prior fuel tank assemblies.

19 Claims, 5 Drawing Sheets

MULTI-FUNCTION FUEL PUMP MODULE

FIELD OF THE INVENTION

This invention relates generally to fuel systems and more particularly to an improved fuel pump module.

BACKGROUND OF THE INVENTION

Typical automotive fuel systems have a fuel pump mounted within and received through an opening of a fuel tank, a vapor vent valve received in a second opening through the vehicle fuel tank and an over pressure relief valve and/or a recirculation outlet disposed in additional openings through the vehicle fuel tank. Additional vapor vent valves may be provided each disposed in a separate opening through the vehicle fuel tank and each constructed to communicate fuel vapors within the fuel tank with a fuel vapor canister outside of the fuel tank. The overpressure relief valve may vent to the atmosphere fluid or vapor from the fuel tank when an excessive pressure is developed in the fuel tank.

Each opening through the fuel tank provides a leak path through which hazardous hydrocarbon fuel vapors may escape to the atmosphere. Notably, a fuel tank may have a plurality of openings therethrough for each of a plurality of separate components thereby providing a plurality of leak paths through which hydrocarbon vapors may escape. Under increasingly strict governmental regulations, the emissions of these hazardous hydrocarbon fuel vapors to the atmosphere must be reduced.

Further, some prior fuel pump modules disposed within a vehicle fuel tank and containing a fuel pump are designed to break away from a flange assembly which connects the module to the fuel tank to reduce the likelihood that the flange will be separated from the fuel tank or severely damaged thereby permitting liquid fuel or fuel vapors to escape from the fuel tank. After breaking away, the fuel pump module may damage other components in the fuel tank such as a vapor vent valve, thereby damaging or destroying the other components.

SUMMARY OF THE INVENTION

A module constructed to be disposed within a fuel tank of the vehicle fuel system carries a vapor vent valve, a fuel pump and other components, such as a fuel level sender and an overpressure relief valve and outlet. Each of these components may thus be inserted through a single opening into the fuel tank to reduce the number of openings in the fuel tank to thereby reduce the emissions of hazardous hydrocarbon fuel vapors from the fuel tank. Further, the module provides additional protection to the vapor vent valve to prevent sloshing fuel within the fuel tank from entering the vent valve and escaping from the fuel tank and being transferred to the fuel vapor storage canister. Still further, if the module is constructed such that a portion containing the fuel pump is designed to break away from the rest of the module sealed to the fuel tank, the fuel pump will move away from the vapor vent valve during a vehicle accident instead of crashing into the valve and damaging or destroying it as in prior fuel tank assemblies.

Objects, features, and advantages of this invention include providing a module for a vehicle fuel system which permits a plurality of components to be received through a single opening in the fuel tank, lowers the emission of hazardous hydrocarbon fuel vapors from the fuel tank, inhibits fuel sloshing, inhibits sloshing fuel from entering a vapor vent valve received in the module, reduces the likelihood that a break away portion of the module will damage the vapor vent valve during and after a vehicle accident, enables enhanced baffling, significantly decreases the time and cost of assembling and mounting the components in a fuel tank, controls the flow of fuel vapor from the fuel tank, and is of relatively simple design and economical manufacture and assembly, is rugged, durable, and has a long useful life in service.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENT

Figure 1:
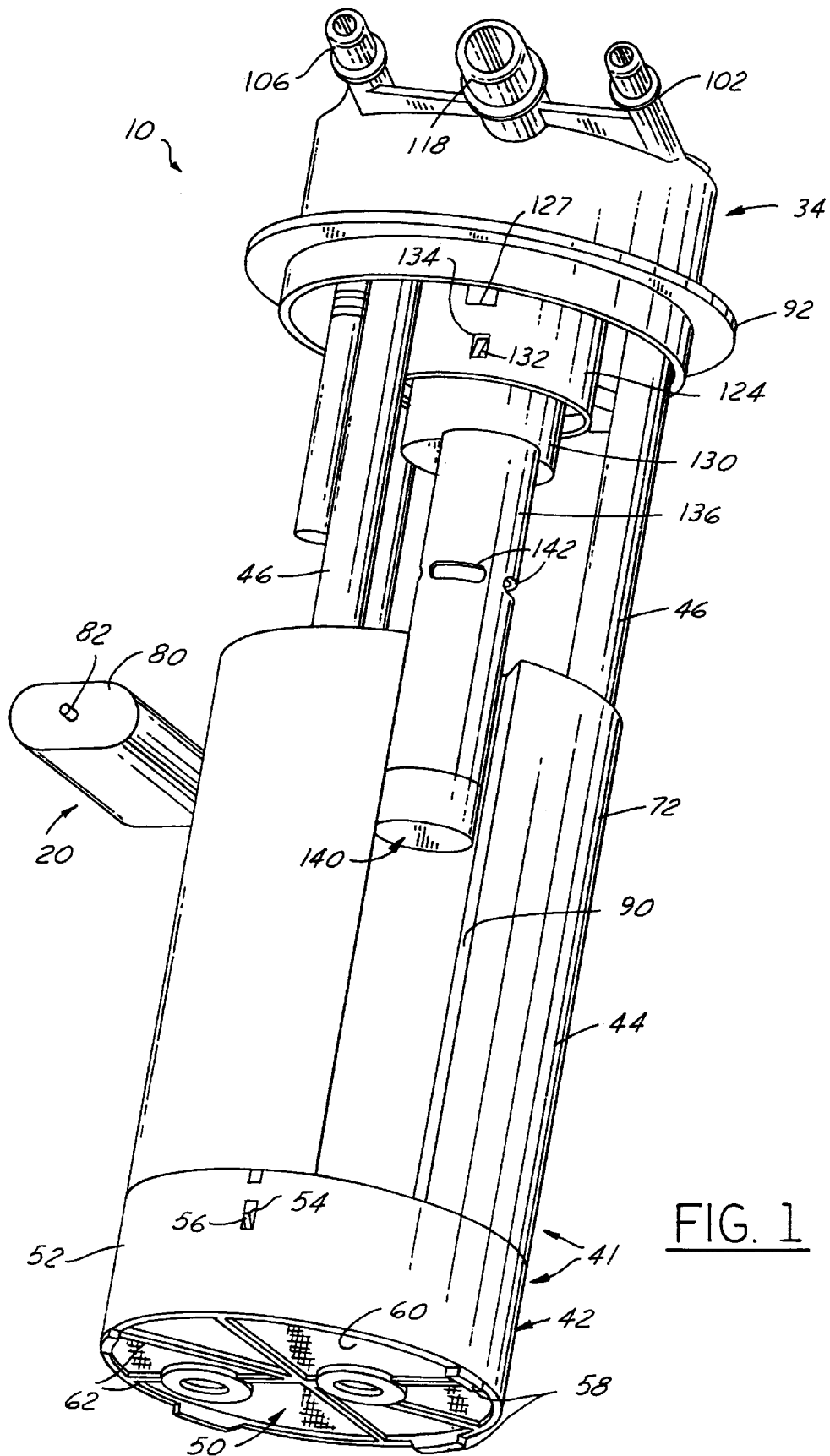
FIG. 1 is a perspective view of a module embodying the present invention.
Figure 2:
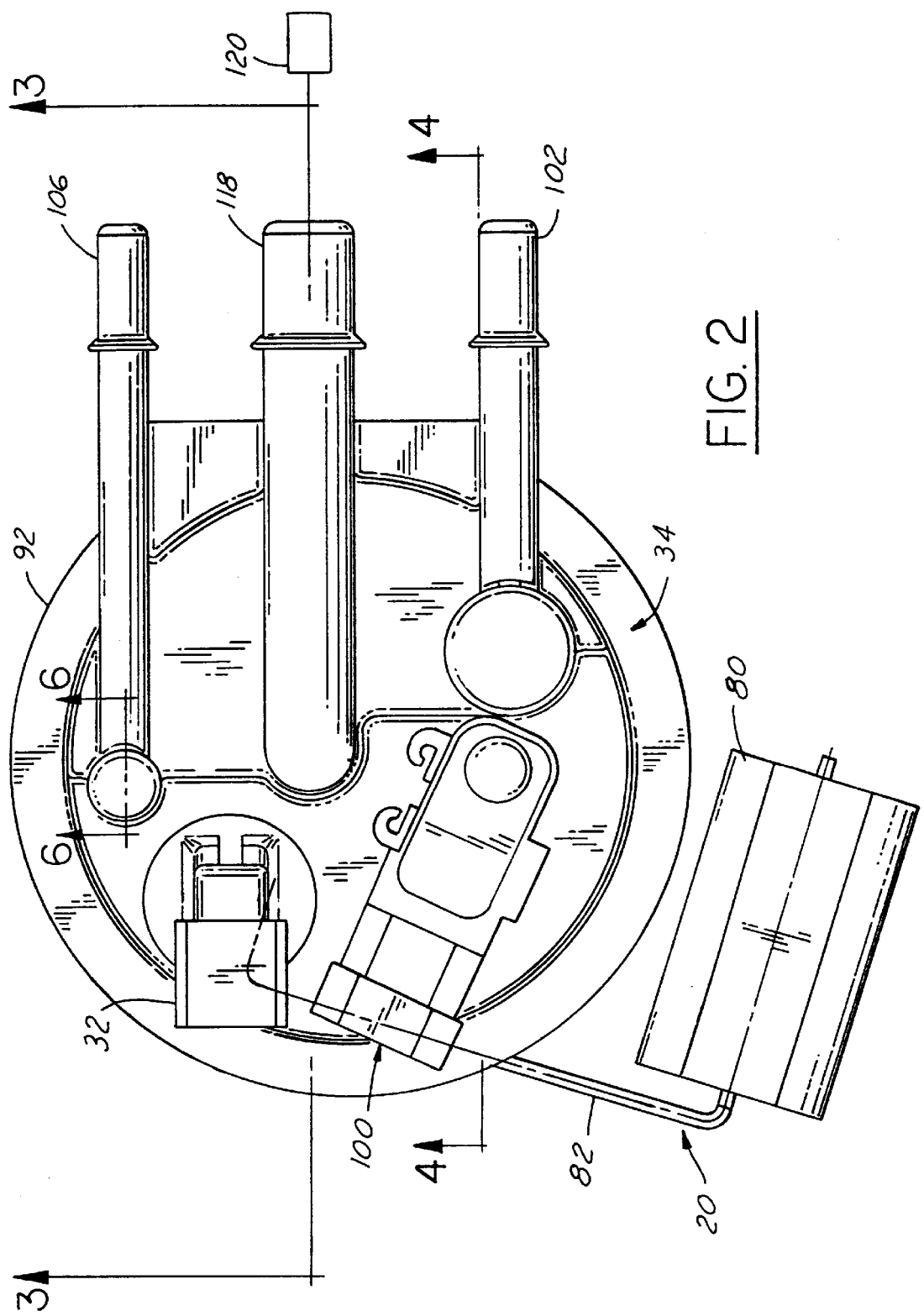
FIG. 2 is a top view of the module in FIG. 1.

Referring in more detail to the drawings, FIGS. 1–5 illustrate a module 10 constructed to be disposed through a single opening of and in a fuel tank 12 of a vehicle fuel system. The module 10 has a fuel reservoir, a fuel pump 14 (FIG. 4), a rollover vapor vent valve 16 (FIG. 3), and preferably, additional components such as an overpressure relief valve 18 (FIG. 6) and a fuel level sender 20. By disposing the various components on or within the module 10, each of the components may be received through a single common opening 22 in the fuel tank 12 to reduce the escape to the atmosphere of hazardous hydrocarbon fuel vapors from the fuel tank 12. The module 10 also provides additional protection to the vapor vent valve 16 from sloshing fuel to prevent liquid fuel from escaping from the fuel tank 12 through the vapor vent valve 16. Desirably, the vapor vent valve 16 is disposed above the fuel pump 14 within the module 10 to reduce the likelihood that the vapor vent valve 16 will be damaged by a lower portion of the module 10, including the fuel pump 14, which may break away during a vehicle accident.

Figure 4:
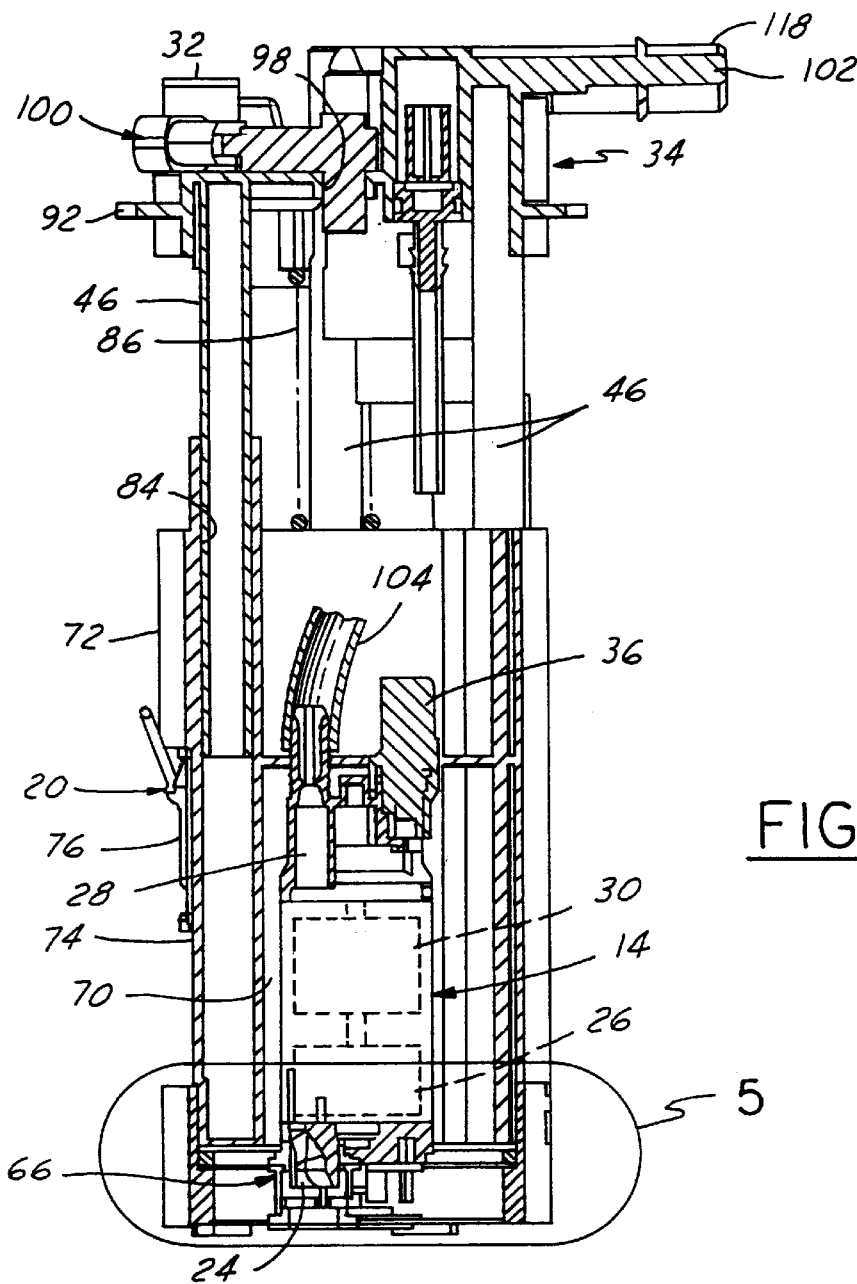
FIG. 4 is a cross-sectional view of the module taken along line 4—4 of FIG. 2.

As shown in FIG. 4, the fuel pump 14 has an inlet 24 through which filtered fuel is drawn into a pumping assembly 26 which increases the pressure of the fuel and discharges that fuel through an outlet 28 of the fuel pump 14. The pumping assembly 26 is driven by an electrical motor 30 supplied with electrical power from outside of the fuel tank 12 through an electrical connector 32 extending through an upper end cap 34 of the module 10 by a harness with electrical wires connected by a plug to one end of this connector 32 and at its other end to a second electrical connector 36 carried by the fuel pump 14. The fuel pump 14 may be of substantially any type including a positive displacement fuel pump such as disclosed in U.S. Pat. No. 5,219,277 or turbine type fuel pump such as disclosed in U.S. Pat. No. 5,257,916, the disclosures of each of these patents are incorporated herein by reference in their entirety.

The module 10 has a housing defined by the upper end cap 34 to be sealed to the fuel tank, a lower portion 41 of the module 10 comprising a lower end cap 42, an intermediate shell 44 attached to the lower end cap 42 and a plurality of frangible arms 46 interconnecting the shell 44 and upper end cap 34. The arms 46 are designed to break when a force above a threshold force acts on them such as when the vehicle is involved in an accident causing a sudden deceleration acting on the lower portion of the module housing 10. This prevents an excessive force from being applied to the upper end cap 34 to prevent breaking the seal between it and fuel tank 12.

The lower end cap 42 is preferably generally cylindrical with a generally circular bottom wall 50 and an upstanding side wall 52 having openings 54 in which resilient fingers 56 of the shell 44 are snap-fit to retain the lower end cap 42 on the shell 44. The bottom wall 50 preferably has a plurality of circumferentially spaced feet 58 to provide a gap between the bottom wall 50 and the bottom of the fuel tank 12 through which fuel may be drawn from the tank into the module 10. To filter fuel before it is drawn into the fuel pump 14, the bottom wall 50 preferably has a layer of filter material 60 stretched across the bottom wall 50 and preferably attached to an open frame defined by spaced apart fingers 62.

Figure 3:
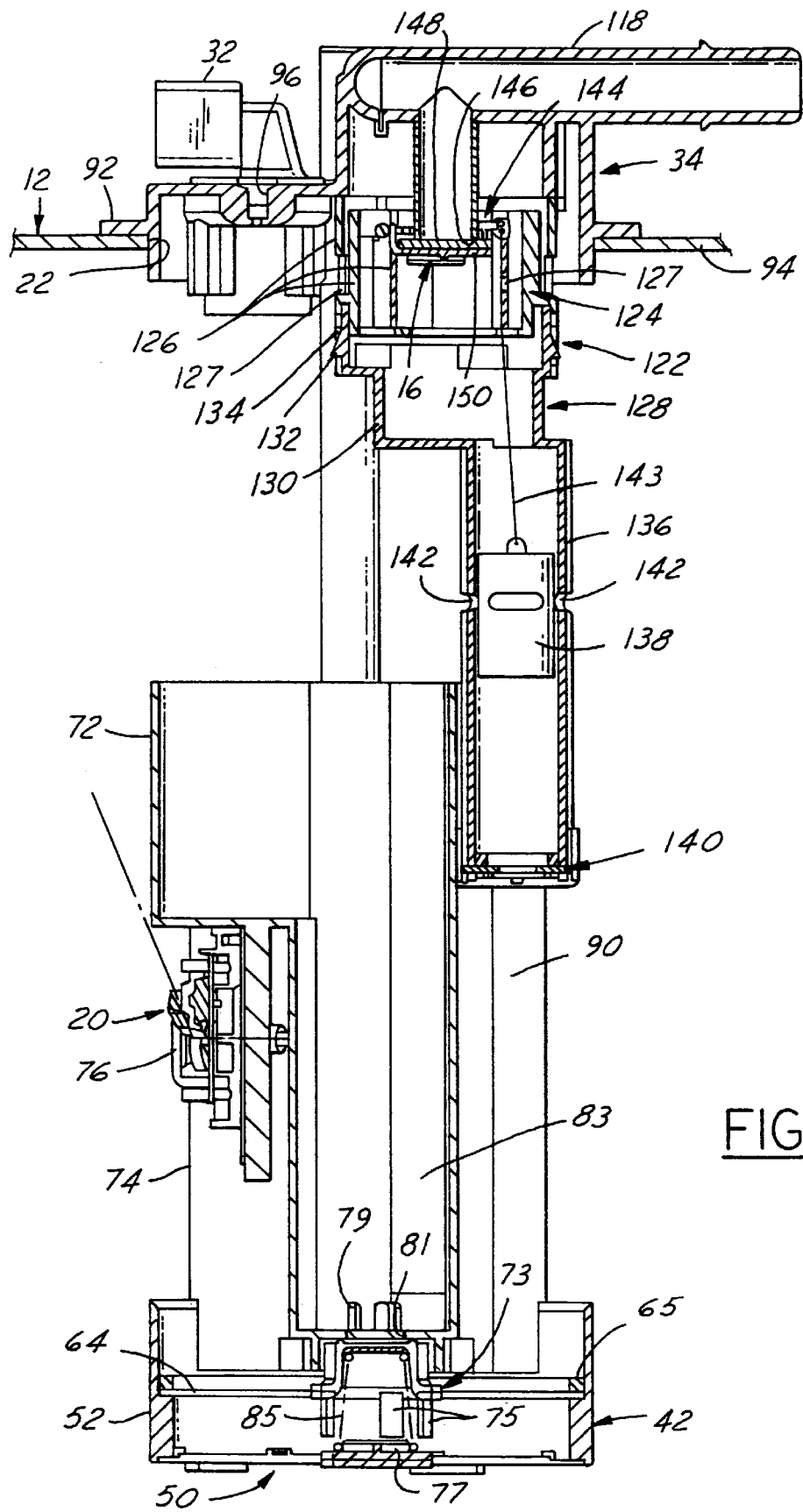
FIG. 3 is cross-sectional view of the module taken along line 3—3 of FIG. 2.
Figure 5:
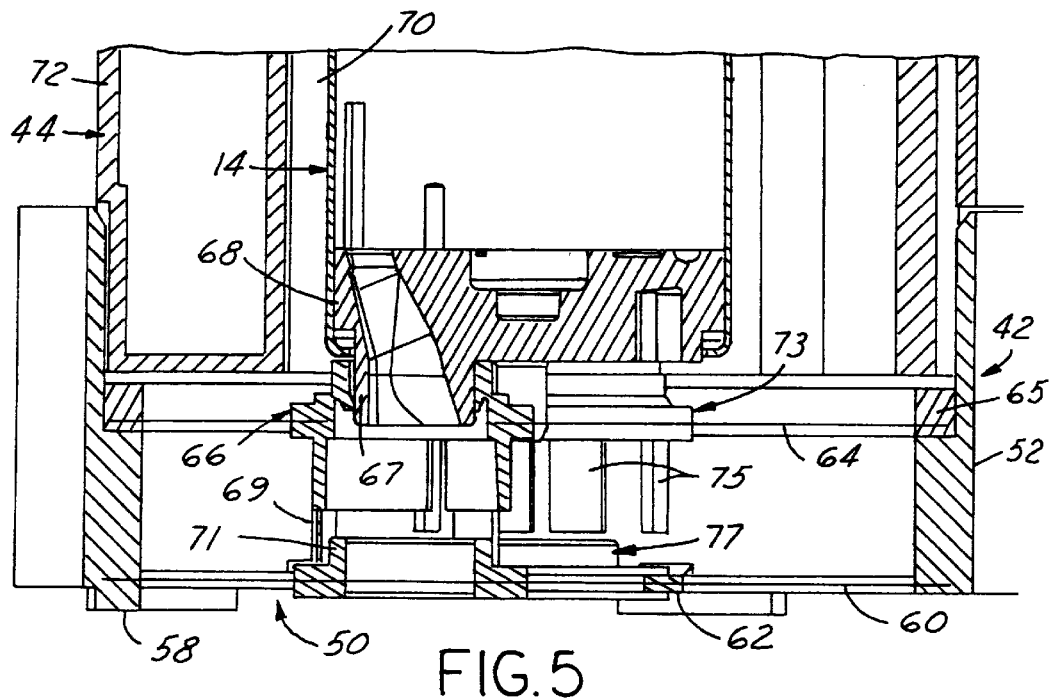
FIG. 5 is an enlarged view of the encircled portion 5 in FIG. 4.

As best shown in FIGS. 3–5, the lower end cap 42 also has an intermediate layer of filter material 64 held in place by an annular retainer 65 and constructed to filter fuel which enters the open upper end of the cap 42 from the shell 44 before it is drawn into the fuel pump 14. A generally cylindrical inlet body 66 is attached to and extends from the intermediate layer 64 toward the bottom wall 50 and has a through passage 63 communicating fuel drawn through either filter 60, 64 with the fuel pump 14 while preventing the filter 60 from being drawn into or blocking the inlet 24 of the fuel pump 14. The inlet body 66 is received over a depending projection 67 of an inlet end cap 68 of the fuel pump 14. The inlet body 66 has depending fingers 69 which cooperate with an upstanding ring 71 formed in the bottom wall open frame to maintain the inlet body 66 adjacent to the inlet end cap 68 and to separate the intermediate layer 64 from the bottom wall. A second body 73 carried by the intermediate filter layer 64 has depending fingers 75 which cooperate with an upstanding ring 77 to maintain the intermediate filter layer 64 and the bottom wall separate. Body 73 also has upstanding pins 79 which extend through an opening 81 into a fuel reservoir 83 which holds a small quantity of fuel. A spring 85 biases the body 73 towards the opening 81 to restrict fuel flow from reservoir 83. When layer 64 is not immersed in liquid fuel the wetted filter material of layer 64 prevents air from passing therethrough so that only liquid fuel is drawn into the fuel pump. The pressure drop created by the fuel pump draws the layer 64 downwardly thereby moving body 73 away from opening 81 and permitting fuel in reservoir 83 to flow to the fuel pump. This provides a small reserve supply of fuel to the fuel pump during extremely low fuel level conditions in the fuel tank.

The intermediate shell 44 is generally cylindrical and hollow defining an interior cavity 70 in which the fuel pump 14 is received. A side wall 72 of the shell 44 has a first recess 74 in which the housing and circuitry 76 for a fuel level sender 20 is received. The fuel level sender 20 may have a float 80 carried on one end of an arm 82 which at the other end is pivotally mounted in the housing and connected to a slide of circuitry 76 with the float 80 being buoyant in liquid fuel to vary the orientation of the arm 82 and thereby provide an indication of the fuel level within the fuel tank 12. The side wall 72 of the shell 44 has a plurality of bores 84 (FIG. 4) each constructed to slidably receive a separate frangible arm 46. A spring 86 or other biasing mechanism is preferably disposed between the upper end cap 34 and the shell 44 to yeildably bias the shell 44 and hence, the lower end cap 42 and fuel pump 14, towards the bottom wall of the fuel tank 12. This so-called "bottom referencing" varies the distance between the shell 44 and upper end cap 34 to ensure that the lower end cap 42 and fuel pump inlet 24 are disposed adjacent the bottom wall of fuel tanks having different depths. To receive a float assembly of the vapor vent valve 16 and to permit liquid fuel to act on the float assembly, a second recess 90 is formed in the side wall 72 of the shell 44.

The upper end cap 34 has a generally radially outwardly extending flange 92 constructed to overlie and to be sealed to an upper wall 94 of the fuel tank 12. One opening 96 (FIG. 3) through the upper end cap 34 receives the electrical connector 32 which electrically communicates the components within the fuel tank 12 with the outside of the fuel tank 12. A second opening 98 (FIG. 4) through the upper end cap 34 may receive an onboard diagnostics (OBD) sensor(s) 100 designed to monitor the pressure within the fuel tank 12 during test conditions to determine if any leaks are present within the fuel tank 12. These OBD sensor(s) 100 are required under governmental regulations which mandate that the fuel system be monitored to determine if any leaks or other hazardous conditions are present in the vehicle fuel system. Thus, for example, a vehicle engine electronic control unit may selectively test the fuel tank 12 for leaks at predetermined intervals with a system in place to either increase the pressure within the fuel tank 12 or decrease the pressure or create a vacuum in the fuel tank 12 and thereafter monitor the decay of the created pressure condition with the OBD sensor(s) 100 mounted on the upper end cap 34 to determine if any leaks are present within the fuel tank 12.

Figure 6:
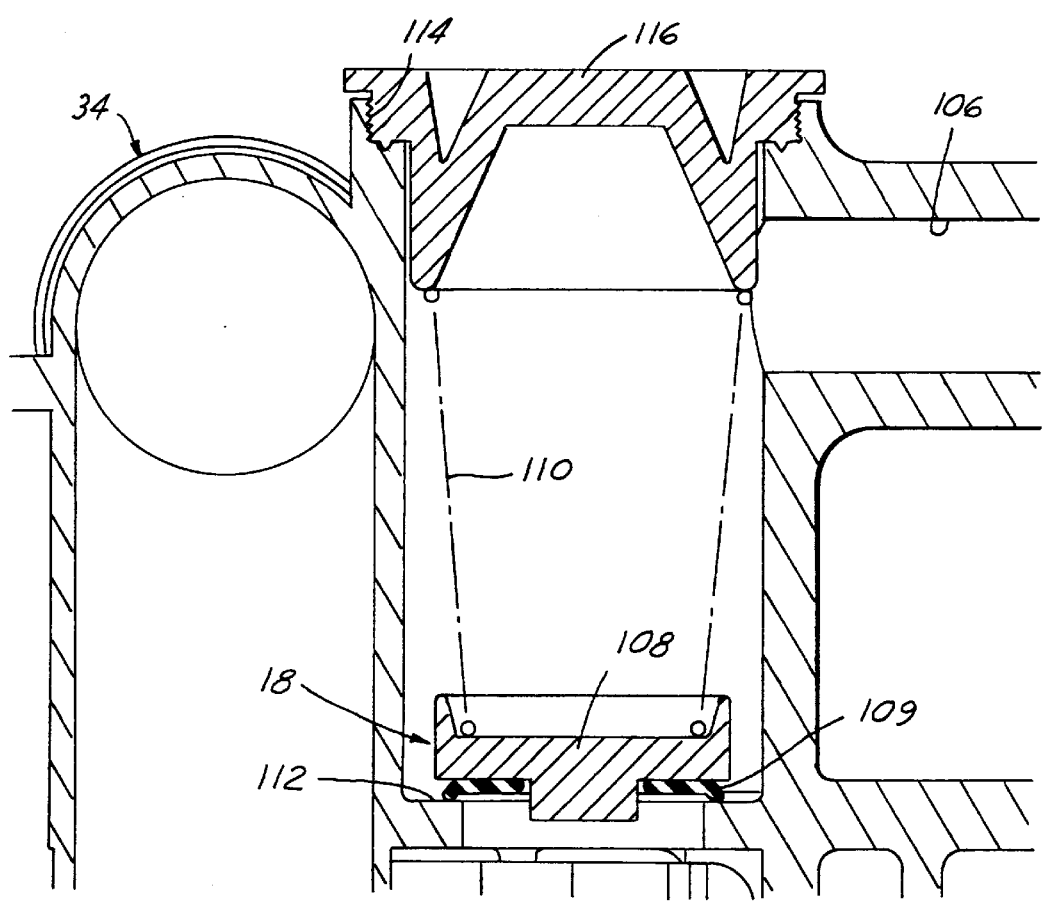
FIG. 6 is a fragmentary cross-sectional view of the module illustrating an overpressure relief valve and overpressure relief outlet.

The upper end cap 34 also has three fluid passages extending therethrough with a first fluid passage 102 communicated and interconnected with the outlet 28 of the fuel pump 14 by an intermediate conduit 104 as shown in FIG. 4. A second fluid passage 106 communicates with the interior of the tank through an overpressure relief valve 18 as shown in FIG. 5 which opens when a threshold pressure is reached within the fuel tank 12 to vent the fuel tank 12 to the atmosphere and thereby limit the maximum pressure within the fuel tank 12. As shown in FIG. 6, the overpressure relief valve 18 preferably has a valve head 108 with a closure 109 yieldably biased by a spring 110 onto a valve seat 112 to prevent fluid flow through the second fluid passage 106. The overpressure relief valve 18 may be received in the upper end cap 34 through an opening 114 closed and sealed by a cap 116 inserted therein.

The third fluid passage 118 communicates fuel vapor downstream of the vapor vent valve 16 with a fuel vapor storage canister 120 disposed outside of the fuel tank 12. As shown in FIG. 3, the vapor vent valve 16 preferably has a housing 122 with a first portion 124 having a plurality of radially spaced and circumferentially extending walls or baffles 126 with circumferentially spaced openings 127 which provide a circuitous path through which fuel vapor may flow through the vapor vent valve 16 and which prevents liquid fuel from escaping from the fuel tank 12 through the valve 16. A second portion 128 of the housing 124 has a generally cup-shaped upper end 130 carried by the first portion 124 which has generally radially outwardly extending dogs 132 which snap-fit into slots 134 of the somewhat resilient first portion 124 to attach the first and second portions. The second portion 128 also has a generally cylindrical, elongate and hollow tube 136 in which a float 138 responsive to the level of liquid fuel in the tube 136 is received. A check valve 140 covering the bottom of the tube 136 permits fuel flow out of the tube 136 while preventing fuel flow into the tube 136 through the check valve 140. Circumferentially spaced fuel entry openings 142 disposed above the check valve 140 permit fuel to flow into the tube to actuate the float 138.

The rollover vapor vent valve 16 has a wire 143 connecting the float 138 to a valve head assembly 144 which has a seat 146 and a pivotally mounted closure 148 actuated by the float 138 and providing a variable flow rate orifice. Preferably, the float 138 opens the valve head assembly 144 through a pivoted stripper plate 150 which applies a force primarily to only a portion of the flexible valve closure 148 to decrease the force required to initially open the valve 16 and hence, increase its sensitivity and responsiveness. Preferably, regardless of the fuel level, this vapor vent valve 16 also fully closes in the event of a rollover accident to prevent liquid fuel and vapor from being discharged from the tank 12. The vapor vent valve 16 is preferably constructed substantially the same as the vapor vent valve disclosed in U.S. patent application Ser. No. 08/963,340, the disclosure of which is incorporated herein by reference in its entirety. Regardless of its construction, the vapor vent valve 16 preferably permits fuel vapor to flow from within the fuel tank 12 to a vapor canister 120 outside the fuel tank 12 while preventing liquid fuel from escaping from the fuel tank 12 therethrough.

Figure 7:
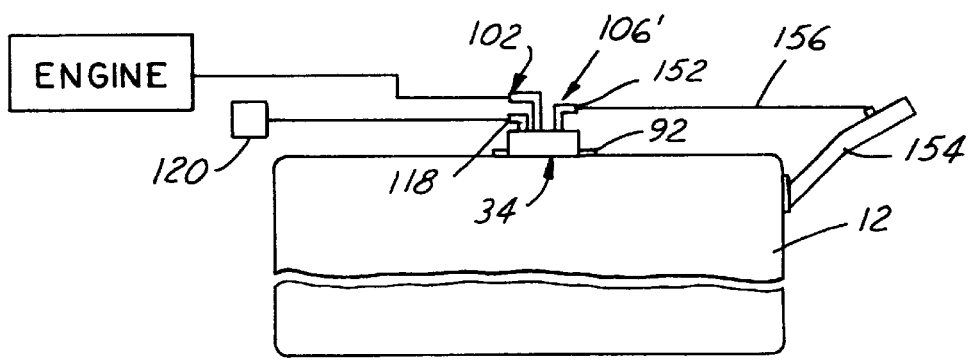
FIG. 7 is a diagrammatic view of a module constructed according to an alternate embodiment of the invention and having a recirculation outlet communicated with a fill pipe.

Alternatively, as shown in FIG. 7, a modified second fluid passage 106' or an additional passage through the upper end cap 34, may provide a recirculation outlet 152 communicating fuel vapor within the fuel tank 12 with a fill pipe 154 of the tank 12. When liquid fuel is added to the fuel tank 12 through the fill pipe 154, a pressure drop is created in the fill pipe 154 which may draw fuel vapor from the fuel tank 12 through the recirculation outlet 152 and a conduit 156 to combine the fuel vapor with liquid fuel being added to the tank. The cooler liquid fuel being added to the tank will condense at least some of the fuel vapor to liquid fuel to reduce the amount of fuel vapor in the system.

Thus, this multi-function module 10 for a vehicle fuel system carries a vapor vent valve 16 and a fuel pump 14 to reduce the number of openings through the fuel tank 12 and thereby reduce the emission of hazardous hydrocarbon vapors to the atmosphere. The module 10 may also carry an overpressure relief valve 18, an OBD sensor 100, an electrical connector 32 to electrically communicate components within the fuel tank 12 with components outside of the fuel tank 12, and a fuel level sender 20 to provide a substantially complete liquid fuel and fuel vapor handling system which may be disposed within a single opening 22 in the vehicle fuel tank 12. Further, the fuel pump 14 and the lower portion 41 of the module 10 are carried by frangible arms 46 designed to break when a force exceeding a threshold force acts on the arms 46, such as during a vehicle accident, so that the lower portion 41 of the module 10 and fuel pump 14 break away from the upper end cap 34 sealed to the fuel tank 12 to prevent destroying the seal between the upper end cap 34 of the module 10 and the fuel tank 12. Because the vapor vent valve 16 and overpressure relief valve 18 are carried by the same module 10 as the fuel pump 14, they are less likely to be damaged or destroyed by the fuel pump 14 and lower portion 41 of the module 10 after they break away from the upper end cap 34 of the module 10 as described.

What is claimed is:

1. A module adapted to be carried by a fuel tank, comprising:

a housing constructed to be at least partially received in an opening of a fuel tank and having a lower portion and an upper portion with a flange constructed to be sealed to a wall of the fuel tank in assembly, a first fluid outlet constructed to communicate the interior of the fuel tank with the exterior of the fuel tank, a fuel pump in the tank, carried by the lower portion of the housing and having an inlet in the tank through which fuel is drawn from the tank and an outlet through which fuel is discharged under pressure with the outlet of the fuel pump communicating with the first fluid outlet to discharge fuel through the first fluid outlet to the exterior of the tank; and at least one frangible arm interconnecting the upper portion and lower portion of the housing and constructed to break when a force greater than a threshold force acts on the arm to permit the lower portion to separate from the upper portion of the housing without destroying the seal between the flange and the wall of the tank.

2. The module of claim 1 which also comprises a third fluid outlet in the housing constructed to communicate the interior of the fuel tank with the exterior of the fuel tank and an over-pressure relief valve carried by the housing and having a valve head yieldably biased to a closed position bearing on a valve seat to prevent fluid flow through the third fluid outlet when closed and displaceable to an open position when the pressure in the fuel tank reaches or exceeds a threshold pressure to permit fluid flow from the fuel tank through the third fluid outlet.

3. A module adapted to be carried by a fuel tank, comprising:

a housing constructed to be at least partially received in an opening of a fuel tank and having a lower portion and an upper portion with a flange constructed to be sealed to a wall of the fuel tank in assembly, a first fluid outlet constructed to communicate the interior of the fuel tank with the exterior of the fuel tank and a second fluid outlet constructed to communicate the interior of the fuel tank with the exterior of the fuel tank;

a fuel pump in the tank, carried by a lower portion of the housing and having an inlet in the tank through which fuel is drawn from the tank and an outlet through which fuel is discharged under pressure with the outlet of the fuel pump communicating with the first fluid outlet to discharge fuel through the first fluid outlet to the exterior of the tank;

a vapor vent valve carried by the housing having a valve seat and a valve closure having an open position spaced from the valve seat to permit fluid flow from the fuel tank through the second fluid outlet and a closed position bearing on the valve seat to prevent fluid flow from the fuel tank through the second fluid outlet of the housing; and at least one frangible arm interconnecting the upper portion and lower portion of the housing and constructed to break when a force greater than a threshold force acts on the arm to permit the lower portion to separate from the upper portion of the housing.

4. The module of claim 3 wherein the lower portion of the housing has one bore for each arm with each arm slidably received in a separate bore to permit the distance between the upper portion and lower portion to be varied.

5. The module of claim 4 which also comprises at least one spring disposed between the upper portion and lower portion to yieldably bias the lower portion away from the upper portion to dispose the lower portion adjacent the bottom of a fuel tank in which the module is received.

6. The module of claim 3 wherein the vapor vent valve is carried by the upper portion of the housing.

7. The module of claim 6 wherein the vapor vent valve is disposed within a valve housing carried by the module housing and having a first portion with a plurality of generally radially spaced walls with circumferentially spaced openings therethrough defining a circuitous vapor flow path from the inside of the fuel tank to the vapor vent valve.

8. The module of claim 7 which also comprises a float slidably carried by a second portion of the valve housing connected to the first portion of the valve housing, the float is operably connected to the vapor vent valve and responsive to the level of liquid fuel in the second portion of the valve housing to control the movement of the vapor vent valve between its open and closed positions.

9. The module of claim 3 wherein the lower portion of the module housing has a shell surrounding the fuel pump and a lower end cap closing one end of the shell, constructed to be received on a bottom wall of a fuel tank and having a passage communicating the inlet of the fuel pump with the fuel tank.

10. The module of claim 9 wherein the shell has resilient, outwardly extending fingers constructed to be received in openings in the lower end cap in assembly to connect the lower end cap and shell together.

11. The module of claim 8 wherein the second portion of the valve housing has resilient, outwardly extending fingers constructed to be received in openings in the first portion of the valve housing to connect the first and second portions of the valve housing together.

12. The module of claim 3 which also comprises a fuel level sender carried by the housing and constructed to be received in a fuel tank.

13. The module of claim 3 which also comprises an additional fluid outlet communicating with the interior of the fuel tank and a fill pipe through which fuel is added to the fuel tank.

14. The module of claim 1 which also comprises a second fluid outlet in the housing constructed to communicate the interior of the fuel tank with the exterior of the fuel tank and an over-pressure relief valve carried by the housing and having a valve head yieldably biased to a closed position bearing on a valve seat to prevent fluid flow through the second fluid outlet when closed and displaceable to an open position when the pressure in the fuel tank reaches or exceeds a threshold pressure to permit fluid flow from the fuel tank through the second fluid outlet.

15. The module of claim 1 wherein the lower portion of the housing has one bore for each arm with each arm slidably received in a separate bore to permit the distance between the upper portion and lower portion to be varied.

16. The module of claim 15 which also comprises at least one spring disposed between the upper portion and lower portion to yieldably bias the lower portion away from the upper portion to dispose the lower portion adjacent the bottom of a fuel tank in which the module is received.

17. The module of claim 1 wherein the lower portion of the module housing has a shell surrounding the fuel pump and a lower end cap closing one end of the shell, constructed to be received on a bottom wall of a fuel tank and having a passage communicating the inlet of the fuel pump with the fuel tank.

18. The module of claim 17 wherein the shell has resilient, outwardly extending fingers constructed to be received in openings in the lower end cap in assembly to connect the lower end cap and shell together.

19. The module of claim 1 which also comprises a fuel level sender carried by the housing and constructed to be received in a fuel tank.

* * * * *

UNITED STATES PATENT AND TRADEMARK OFFICE
CERTIFICATE OF CORRECTION

PATENT NO. : 6,213,100 B1  
DATED : April 10, 2001  
INVENTOR(S) : Mark R. Johansen Page 1 of 1

It is certified that error appears in the above-identified patent and that said Letters Patent is hereby corrected as shown below:

<u>Column 6,</u>
Line 28, delete "claim 1" and insert -- claim 3 --.

Signed and Sealed this

Twenty-fifth Day of December, 2001

Attest:

*Attesting Officer*

JAMES E. ROGAN
*Director of the United States Patent and Trademark Office*